UNITED STATES PATENT OFFICE.

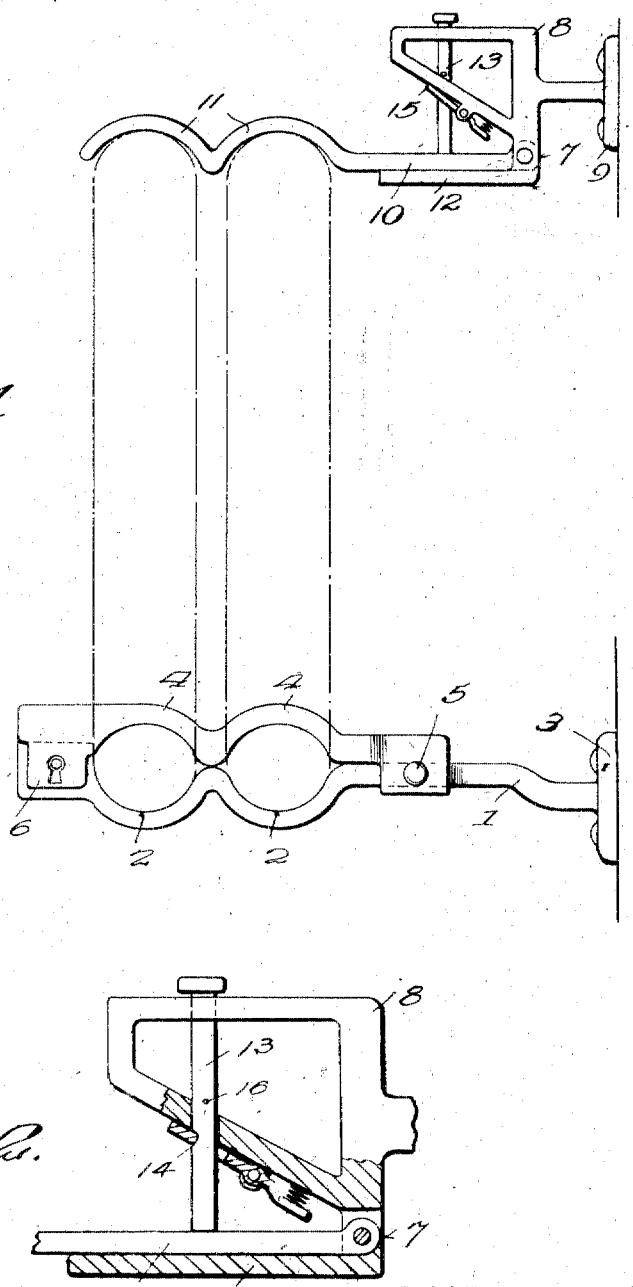

CLEMENS H. LUECKENHOFF, OF SCIOTOVILLE, OHIO.

TIRE-SUPPORTING BRACKET.

1,281,609.

Specification of Letters Patent.　Patented Oct. 15, 1918.

Application filed June 26, 1917. Serial No. 177,001.

*To all whom it may concern:*

Be it known that I, CLEMENS H. LUECKENHOFF, a citizen of the United States, and resident of Sciotoville, in the county of Scioto and State of Ohio, have invented certain new and useful Improvements in Tire-Supporting Brackets, of which the following is a specification.

This invention relates to improvements in tire supporting brackets for use on motor driven and other vehicles; the dominant object of the invention being to provide a bracket for removably supporting extra tires in a manner such as will prevent accidental displacement thereof and yet, will allow the tires to be readily removed as it is desired.

Among other aims and objects of the invention may be recited, the provision of a bracket of the character mentioned, with a view to compactness and in which the number of parts are few, the construction simple, the cost of production small, and efficiency in operation high.

All of the foregoing together with additional advantageous details and arrangement of parts of the preferred embodiment of my invention will be clear from the specific description hereinafter contained, when read in connection with the accompanying drawings forming part thereof, wherein said embodiment of the invention is illustrated for the purpose of facilitating a full understanding of the present improvements.

In the drawings:

Figure 1 is a side elevation of the improved bracket with tires applied thereto; and Fig. 2 is a fragmentary detail partly in section showing the means for supporting the arm of the tire securing bracket in a lowered position.

Referring now more particularly to the drawings and in connection with which like reference characters will designate corresponding parts throughout the several views. 1 indicates a bracket arm having offset portions or seats 2 formed therein whereby the tread portions of pneumatic tires or shoes may be received therein. The bracket is of course provided with an apertured base 3, which base may be either secured to the end of the arm as shown in the Fig. 2, or if desired, may be arranged intermediate the end of the arm 1 and secured to the running board of a motor driven vehicle. The outer end of the arm 1 is provided with a keeper whereby locking means hereinafter described may be received therein. A second arm having off-set portions 4 corresponding to the off-set portions 2 is pivotally secured to the arm 1 intermediate its ends as at 5 and carries upon its free end a lock 6, the bolt of which is adapted to be received within the outer end of the arm 1. Thus, it will be understood that when the tread portions of the tires are arranged within the off-set portions, or seats 2 the pivotally mounted arm may be swung thereover and lock into engagement with the free end of the arm 1, thereby preventing removal of the tires by unauthorized persons.

Arranged directly above the tire supporting bracket and preferably in alinement therewith is a tire securing bracket designated in its entirety by the numeral 7, this bracket including a body portion 8 having an apertured plate 9 formed upon one side thereof whereby the same may be secured to the side of a motor driven vehicle or the like. Pivotally secured to the lower extremity of the body portion 8 is an arm 10 having off-set portions or seats 11 formed in its outer end. Downward movement of the pivotal arm 10 is limited by a rigid arm 12 formed integral with the lower extremity of the body portion 8 and extending laterally therefrom under the inner portion of said arm 10.

As means for maintaining the pivotal arm 10 in its lower position, a bolt 13 is slidably engaged with the body portion 8 and is formed with a notch 14 with which a pivotal pressed latch 15 is adapted to be engaged at times. Downward movement of the bolt 13 is limited by a cross pin 16 or the like, which pin, obviously has bearing upon the lower portion of the body 8.

In operation, the lower portions of the tires are placed within the seats 2 of the arm 1 whereupon the pivotal arm associated therewith is swung over the same and locked by means of the lock 6. The upper bracket then has its arm 10 swung downwardly so that the seats 11 formed therein engage over the tread portions of the tires, whereupon the slidable bolt 13 is moved downwardly into engagement with the said arm. When in this position the spring pressed pivotal latch 15 will engage the notch 14 in the slidable bolt and maintain the same in engagement with the arm 10. Obviously, to remove the tires it is only necessary to release the slidable bolt 13 and the pivotal arm of the lower supporting bracket.

Manifestly, the construction shown is capable of considerable modification and such modification as is within the scope of my claims I consider within the spirit of my invention.

I claim:

1. A device of the character described including in combination with a lower bracket, an upper bracket, an arm extending laterally from the lower portion of said upper bracket, a second arm pivoted to the lower portion of the upper bracket and having a portion thereof receivable on said lateral arm, a vertical bolt slidable in said upper bracket, and releasable catch means on the upper bracket engageable with the bolt for maintaining the same in engagement with the second arm.

2. A device of the character described including in combination with a lower bracket, an upper bracket having a diagonally disposed apertured bar, an arm formed integral with the lower end of the upper bracket and extending laterally therefrom, a second arm pivoted at one end to the lower end of the upper bracket and having a portion thereof receivable on said lateral arm, a vertical bolt slidable on the upper bracket and received through said diagonal apertured bar, and catch means arranged on the diagonal apertured bar engageable with the vertical bolt for maintaining the same in engagement with said second arm.

In testimony whereof, I affix my signature hereto.

CLEMENS H. LUECKENHOFF.